United States Patent [19]

Arai et al.

[11] 3,933,502

[45] Jan. 20, 1976

[54] 1,4-BIS(2-ISOPROPYL-6-METHYLANILINO)ANTHRAQUINONE AND A POLYETHYLENE TEREPHTHALATE FILM CONTAINING SAME AS AN X-RAY PHOTOGRAPHIC FILM SUPPORT

[75] Inventors: Atsuaki Arai; Noburo Hibino; Kunihira Seto, Minami-ashigara, Japan

[73] Assignee: Fuji Photo Film Co., Ltd., Minami-ashigara, Japan

[22] Filed: Aug. 3, 1973

[21] Appl. No.: 385,264

[30] Foreign Application Priority Data

Aug. 5, 1972 Japan.............................. 47-78473

[52] U.S. Cl. ................................ 96/84 R; 96/87 R
[51] Int. Cl.² ........................................ G03C 1/84
[58] Field of Search ......................... 96/84 R, 87 R

[56] References Cited

UNITED STATES PATENTS 3,488,195    1/1970    Hunter............................... 96/84 R

OTHER PUBLICATIONS

Coles, R, F., Def. Publ. of S.N. 281,835, filed 8-18-72, Def. Publ. No. T910,004.

Primary Examiner—Ronald H. Smith
Attorney, Agent, or Firm—Sughrue, Rothwell, Mion, Zinn & Macpeak

[57] ABSTRACT

1,4-bis(2'-Isopropyl-6'-methylanilino)anthraquinone and a polyethylene terephthalate film support containing this anthraquinone. The anthraquinone has high heat stability and good sublimation characteristics, and has no adverse effects on photographic characteristics when a polyethylene terephthalate film containing the anthraquinone is used as a film support.

4 Claims, 7 Drawing Figures

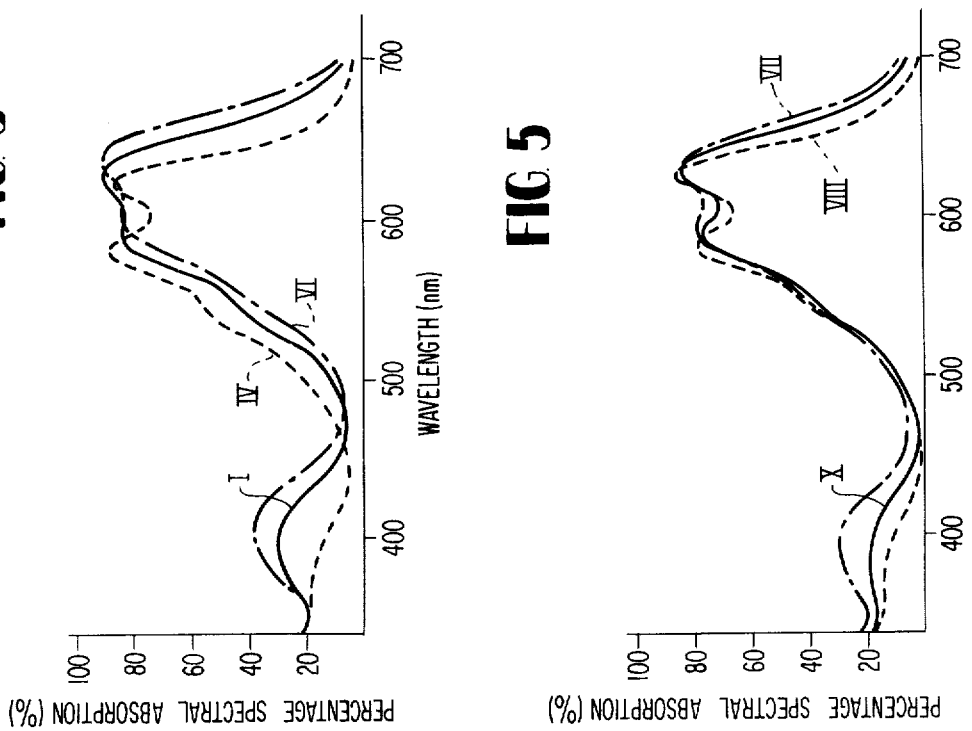
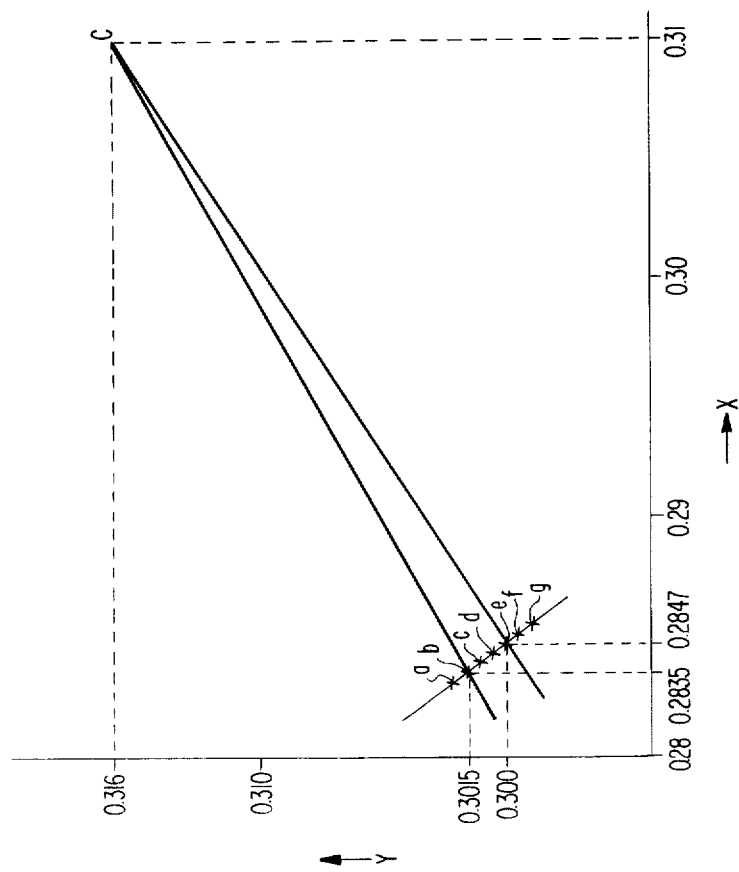
FIG. 2
FIG. 3
FIG. 5

3,933,502

1,4-BIS(2-ISOPROPYL-6-METHYLANILINO)AN-THRAQUINONE AND A POLYETHYLENE TEREPHTHALATE FILM CONTAINING SAME AS AN X-RAY PHOTOGRAPHIC FILM SUPPORT

BACKGROUND OF THE INVENTION

1. Field of the Invention

The present invention relates 1,4-bis(2'-isopropyl-6'-methylanilino)anthraquinone to a polyethylene terephthalate film containing this anthraquinone compound for use as an X-ray photographic film support and, more particularly, to a blue-colored polyethylene terephthalate film resulting from the use of this anthraquinone and having particular utility as an X-ray photographic film support.

2. Discription of the Prior Art

In X-ray photographic films, it is desirable to color the support film blue in order to facilitate the discrimination of the photographic images. Also, it is desirable for the film support not to absorb light in the short wavelength region since an X-ray photographic film has a light-sensitive region in the short wave-length region. Such a support serves to prevent the disadvantages with photographic materials in which a photographic emulsion is provided on both surface of the film support, such as X-ray photographic films, that a filter desensitization action results upon photographing and that photographic images having yellow fog and being difficult to discriminate result.

A dye for coloring polyethylene terephthalatefilms for use as an X-ray photographic film support to achieve the above-described objects must satisfy the requirements of heat resistance, sublimation resistance, compatibility and suitable chromaticity at the same time, must be inert with respect to the gelatin-silver halide emulsion, and must not exert detrimental influences on the photographic properties such as sensitivity, gamma, fog, etc.

Polyethylene terephthalate films are industrially produced using a heat melt extrusion methodh. Therefore, the coloring agent must have sufficient heat resistance to withstand elevated temperatures as high as 270° to 300°C.

Since polyethylene terephthalate film has extremely stable physical structure, coloring methods such as dyeing are not easy. Therefore, a dope-dyeing method is preferable in which a coloring agent is mixed with the polymer either upon synthesis of the polymer or upon heat-melt molding of the polymer to thereby disperse or dissolve the coloring agent in the polyethylene terephthalate. Therefore, the coloring agent must withstand molding temperatures as high as 270°– 300°C and to possess sufficient heat stability not to be decomposed or faded by heat.

The dope-dyeing method which is as described hereinafter employed in the present invention has the advantage that coloring is conducted simultaneously with molding and no additional steps are required.

Polyethylene terephthalate films are prepared by drying the starting pellets, mixing the pellets with a coloring agent and, after heat melting the mixture, extruding, stretching and heat-treating the melt, and forming it into film. Of these steps, the drying step is desirably conducted at temperatures of from 135° to 210°C under reduced pressure as described in Japanese Pat. Publication No. 618/53. Without the drying step, the starting polyester would undergo hydrolysis upon heat-melting, which results in it being impossible to make the film or in producing a film with seriously deteriorated properties, e.g., having low strength.

On the other hand, since polyester films are usually formed into a film according to a tenter method, edge loss is unavoidable. In order to recover and re-use this edge waste, it is crushed and dried together with virgin chips. When the polyester is colored with a coloring agent having poor sublimation resistance, the dye will be sublimed away from the colored edge waste during the drying. Therefore, in addition to the loss of the coloring agent, the sublimed dye stains the dryer and drops falling therefrom on an irregular basis cause unevenness in color density. Also, polyethylene terephthalate is extruded through an extrusion die onto a casting drum to cool. At this time, when the polyester is colored with a easily sublimable coloring agent, the sublimed coloring agent stains the casting drum causing unevenness in dye density of the colored film itself. For these reasons, it is important to color the polyester with a coloring agent having good sublimation resistance.

In conducting the dope-dyeing, it is necessary for the coloring dye to be easily dispersed or dissolved uniformly in polyethylene terephthalate. In particular, for photographic film supports, high transparency and optically defect-free surface conditions are required. Therefore, insufficient dispersion of the coloring agent, rendering the support cloudy, and contamination with granular foreign substances cannot be allowed in the slightest.

As is well known, in order to provide polyethylene terephthalate with useful properties, melt-filmed melt-extruded, melt cast, melt quenched etc. (hereinafter melt-filmed), amorphous, non-oriented polyethylene terephthalate film must be subjected to stretching and heat-treatment under suitable temperature conditions. Therefore, even when the coloring agent is apparently dispersed uniformly in an amorphous, non-oriented film to such an extent that the transparency is not deteriorated, often in the subsequent stretching step, spaces between the fine, dispersed particles of the coloring agent incapable of being plastically deformed and polyethylene terephthalate matrix capable of being plastically deformed to a great extent arise, these vacancies scatter light increasing the cloudiness of the film. Accordingly, in the production of, particularly, photographic film bases, sufficient care is required in dispersing the coloring agent as extremely fine particles so as not to produce spaces in the stretching step which substantially increase the light scattering, or to dissolve the coloring agent in the form of a molecular dispersion.

An object of the present invention is to provide a dye which is heat stable and which can be used in particular with polyethylene terephthalate as a blue dye for an X-ray photographic film support.

It is further an object of this invention to provide a dye which has appropriate blue color characteristics permitting its use as a dye for an X-ray photographic film support and which does not adversely affect the photographic characteristics of the emulsion when it is used in a photographic support.

It is additionally an object of this invention to provide a coloring agent which can be used in a photographic film support and not give rise to a decrease in transparency nor to a cloudiness.

SUMMARY OF THE INVENTION

These and other objects of the invention are achieved with the use of a novel compound, 1,4-bis(2'-isopropyl-6'-methylanilino)anthraquinone, and particular its use in a polyethylene terephthalate support for X-ray photographic films.

BRIEF DESCRIPTION OF THE ACCOMPANYING DRAWINGS

FIG. 2 shows a chromaticity diagram of a polyethylene terephthalate film colored with Dyes A and B according to the method of the present invention.

FIG. 3 shows the spectral absorption curves of Dyes I – VI (measured in an acetone solution) and FIG. 5 shows the spectral absorption curves of Dyes VII, VIII and X measured in an acetone solution.

DETAILED DESCRIPTION OF THE INVENTION

The colors suitable for X-ray photographic film use are described in detail below. The color-indicating methods and the color-measuring methods employed herein are set forth in JIS-Z8701- 1958 and JIS-Z8722-1959, respectively. All colors can be indicated in terms of $x$, $y$ and Y defined in the aforesaid Japanese Industrial Standard. The above-described JIS is specified according to the colorimetric system CIE decided by the Commission Internationale de l'Eclairage, and is explained in Billmeyer & Saltzman; "Principles of Color Technology," pp. 25 – 52, Interscience Publishers (1966); "Journal of the Optical Society of America" vol. 33, No. 11, pp. 627–632, published by Optical Society of America in Nov. 1943, and the like.

Figure 1:
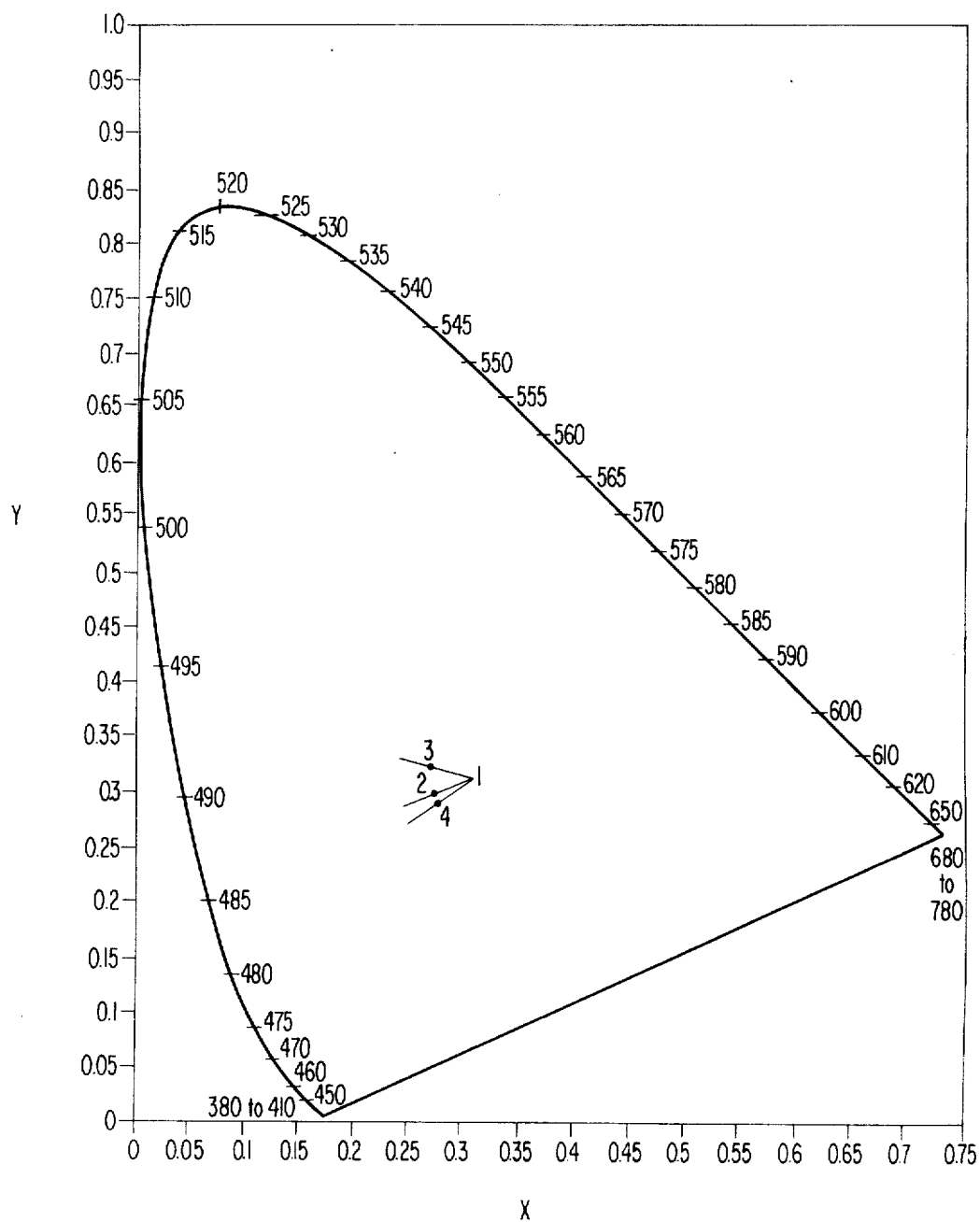
FIG. 1 shows a chromaticity diagram as specified in JIS-Z8701 (1958).

FIG. 1 represents the chromaticity as specified in JIS Z8701-1958, wherein point 1 stands for the light of standard illumination C and point 2 stands for a color suitable for a support of X-ray photographic films. If the thickness of the support is constant, the point indicating the color of the support moves, with the decrease in the content of the dye, to the point 1 approximately along with the straight line linking point 1 with point 2. Therefore, comparing the hues of various dyes with each other, point 3 represents a blue color which is greener in character than that represented by the point 2 while point 4 represents a blue color somewhat more violet in character than that represented by the point 2.

Since X-ray photographic films have a light-sensitive region in the short wave-length region, it is desirable for a film support to absorb less light in the short wavelength region of from 400 to 450 nm. Absorption of light in this region makes the support yellowish, which results in rendering the blue color of the support impure. Thus, the value of X-ray films is decreased due to the visually bad impression.

In order to determine visually the most preferred hue range, seven films different from each other in hue were prepared using two dyes, 1-anilino-4,5,8-trihydroxyanthraquinone (blue) and 1-p-benzyloxyanilino-4-hydroxyanthraquinone (violet) by changing the mixing ratio of the two dyes. Films were formed according to the dope-dyeing method by melting. Medical X-ray films were prepared via the same steps as in Example 1 using the above-described film bases, and exposed to X-rays through an object to be photographed. Thus, images were obtained. The resulting images were arranged on a viewer (made by Seiko Sha Kabushikikaisha) to examine the image characteristics such as contrast and gradation, purity in terms of blue color, visual appearance, and the like. As a result, it was found that the preferred hue for X-ray photographs is in the area of chromaticity diagram between two lines, one connecting illuminant C ($x = 0.310$, $y = 0.316$) and point $b$ ($x = 0.2835$, $y = 0.3015$) and the other connecting illuminant C and point $e$ ($x = 0.2847$, $y = 0.3000$), as shown in FIG. 2.

In FIG. 2, points $a$, $b$, $c$, $d$, $e$, $f$ and $g$ each represents the hue of a 180 $\mu$-thick polyethylene terephthalate film in terms of chromaticity, the film being colored with 0.023 percent by weight of a mixture of 1-anilino-4,5,8-trihydroxyanthraquinone (Dye A) and 1-p-benzyloxyanilino-4-hydroxyanthraquinone (Dye B) in a mixing ratio given in Table 1.

Table 1

| Sample No. | Dye A: Dye B | Chromaticity Coordinates | | Hue |
|---|---|---|---|---|
| | | x | y | |
| a | 55: 45 | 0.2831 | 0.3021 | Bad |
| b | 60: 40 | 0.2835 | 0.3015 | Good |
| c | 65: 35 | 0.2839 | 0.3010 | Good |
| d | 60: 40 | 0.2843 | 0.3005 | Good |
| e | 55: 35 | 0.2847 | 0.3000 | Good |
| f | 50: 50 | 0.2851 | 0.2995 | Bad |
| g | 45: 55 | 0.2855 | 0.2990 | Bad |

As a method for coloring polyethylene terephthalate, it is well known to color with an aminoanthraquinone dye as disclosed in British Pat. No. 651,699, Japanese Pat. Publication No. 26315/68, etc. The dyes described in the above patents are blue or red, with the hues being unsuitable for an X-ray film support. These patents do not teach what types of chemical structure of dyes are suitable for an X-ray film support.

The inventors first examined 1,4-bis(monoalkylanilino)anthraquinones, which, however, were found to be greenish blue and unsuitable for coloring an X-ray photographic support. Then, the inventors examined 1,4-bis(dimethylanilino)anthraquinones. There were obtained 6 structural isomers as shown in Table 2 depending upon the positions substituted by methyl groups.

Table 2

| Compound No. | Compound | m.p. (°C) |
|---|---|---|
| I | 1,4-bis(2',3'-Dimethylanilino)-anthraquinone | 241 |
| II | 1,4-bis(2'-4'-Dimethylanilino)-anthraquinone | 220 – 221 |
| III | 1,4-bis(2'-5'-Dimethylanilino)-anthraquinone | 233 – 234 |
| IV | 1,4-bis(2'-6'-Dimethylanilino)-anthraquinone | 225 |
| V | 1,4-bis(3'-4'-Dimethylanilino)-anthraquinone | 202 – 203 |
| VI | 1,4-bis(3'-5'-Dimethylanilino)-anthraquinone | 254 – 256 |

The structures of these compounds and the physical properties thereof determined by newly synthesizing them are shown in Table 2. Also, wave length of the absorption maximum ($\lambda_{max}$) appearing in a visible region in an acetone solution, molecular extinction coefficient and a spectral absorption maximum ($\lambda_{max}$) of a 0.18 mm-thick blue film prepared by adding 0.02 percent by weight of the dyes to polyethylene terephthalate, dye-blending to dry, and melt-extruding the resulting composition according to a conventional melt-filming method are shown in table 3.

Table 3

| Compound No. | Spectral Absorption in Acetone Solution | | Spectral Absorption in a Colored Polyethylene Terephthalate Film, |
|---|---|---|---|
| | $\lambda$ max (nm) | $\epsilon$ max ($\times 10^4$) | $\lambda$ max (nm) |
| I | 396 | 0.55 | 610 |
| | 592 | 1.53 | 646 |
| | 634 | 1.64 | |
| II | 402 | 0.57 | 620 |
| | 600 | 1.55 | 646 |
| | 634 | 1.66 | 646 |
| III | 400 | 0.59 | 610 |
| | 600 | 1.64 | |
| | 634 | 1.73 | 644 |
| IV | 365 | 0.31 | 591 |
| | 582 | 1.53 | |
| | 628 | 1.39 | 635 |
| V | 408 | 0.62 | 620 |
| | 610 | 1.47 | |
| | 641 | 1.56 | 658 |
| VI | 405 | 0.63 | 618 |
| | 610 | 1.43 | |
| | 644 | 1.52 | 655 |

The spectral absorption curves of Dyes I, IV and VI are shown in FIG. 3 as being representative. Of the isomeric dyes listed in Table 2, compounds in which the o-position of the anilino nucleus is not substituted (V and VI) show a larger absorption at a wave length of 400 nm, which is not desirable for an X-ray film base, and therefore strongly exhibit a greenish blue color, and the compounds having one substituent at the o-position (I, II and III) show a greenish blue color less than that of the former compounds next to them.

In contrast with the dyes of such structures, Compound IV particularly shows two distinctly separated main absorptions (one in the green region and the other in the red region), exhibits hypsochromic effect, i.e., a shift of the absorption peak to the shorter wave length side, and, in addition, exhibits a markedly reduced unnecessary absorption in the region of 360 – 450 nm.

While not desiring to be bound by theory, it is believed that this results from the inability of the anilino nucleus and the anthraquinone nucleus to be coplanar, this lack of coplanarity being due to the steric hindrance arising from the o-substituent.

Figure 4:
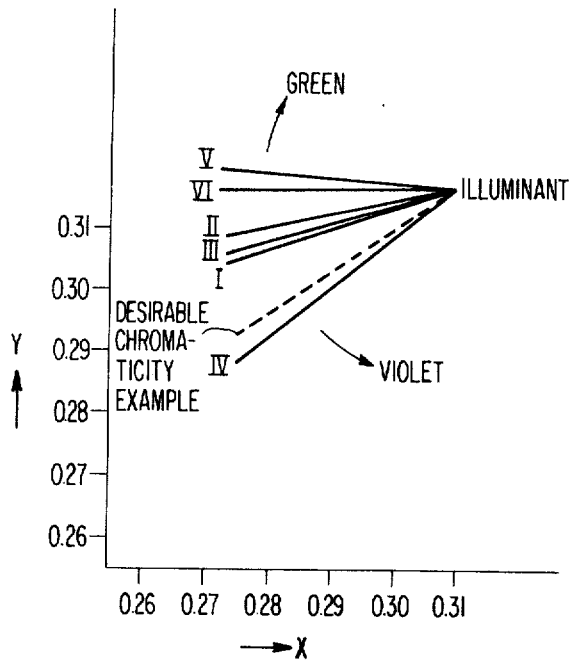
FIG. 4 shows a chromaticity diagram of polyethylene terephthalate films colored with Dyes I – VI given in Table 2.

The hues of these compounds all deviate widely from the desirable hue to green side, as shown in FIG. 4, except for Compound (IV). Only Compound (IV) is less yellowed and shows a distinct blue color which approximates fairly the desirable hue though a little shifted to violet.

Therefore, for further investigation, compounds having as the 2'-substituent an isopropyl group as an alkyl group which greatly influences the steric hindrance and having differing 6'-substitutents (as shown in Table 4) were synthesized to examine the properties thereof.

Table 4

| Compound No. | Compound | m.p. (°C) |
|---|---|---|
| VII | 1,4-bis(2'-Isopropylanilino)-anthraquinone | 149 |
| VIII | 1,4-bis(2'-Isopropyl-6'-methyl-anilino)anthraquinone | 240 – 241 |
| IX | 1,4-bis(2'-Isopropyl-6'-ethyl-anilino)anthraquinone | 211 – 213 |
| X | 1,4-bis(2'-6'-Diisopropyl-anilino)anthraquinone | 205 – 207 |

The structures of the above-described dye compounds and the physical properties measured by newly synthesizing them are shown in Table 4. The spectral absorption characteristics in an acetone solution and in polyethylene terephthalate film measured in the same manner as for the compounds given in Table 2 are shown in Table 5.

Table 5

| Compound No. | Spectral Absorption in Acetone Solution | | Spectral Absorption in a Colored Polyethylene Terephthalate Film |
|---|---|---|---|
| | $\lambda$ max (nm) | $\epsilon$ max ($\times 10^4$) | $\lambda$ max (nm) |
| VII | 400 | 0.56 | 603 |
| | 595 | 1.48 | 644 |
| | 635 | 1.47 | |
| VIII | 370 | 0.31 | 591 |
| | 582 | 1.65 | |
| | 627 | 1.84 | 637 |
| IX | 375 | 0.34 | 592 |
| | 584 | 1.66 | |
| | 629 | 1.84 | 638 |
| X | 387 | 0.40 | 597 |
| | 588 | 1.66 | |
| | 632 | 1.86 | 642 |

The spectral absorption curves of these Compounds (VI, VIII and X) are shown in FIG. 5. From FIG. 5, it was found that, even when the o-position is substituted with a bulky isopropyl group which tends to cause steric hindrance, the monosubstituted derivative (Compound VII) shows undesirable absorption in the short wave-length side which is not reduced to a great extent. However, the effect of the isopropyl group is clearly observed. The absorption spectrum of Compound IV undergoes a hypsochromic shift as compared with the comparative sample 1,4-bis(o-toluidino)anthraquinone (Compound XI) and the dimethylsubstituted isomers (Compounds II, III, V and VI). Actually, Compound IV shows almost the same absorption in the blue region as that of 2,3-dimethyl-substituted derivative (Compound I) and is not preferred from the viewpoint of hue. Also, in the case of the di-substituted derivative (Compound X) having isopropyl groups causing steric hindrance at two o-positions, the coplanar property between the amino nucleus and the anthraquinone nucleus is markedly hindered. Hence, it was expected that the absorption in the blue region would be even more reduced as compared with 2,6-dimethyl substituted derivative (Compound IV) and an excellent hue would be obtained. However, as a result of experiments, it was found that compounds disubstituted at the 2- and 6-positions with bulky groups, such as Compound X, do not show the expected preferred properties. Therefore, it was surmised that, in order to obtain dyes which absorb light in blue region to a lesser extent and provide a turbidity-free blue hue, there would be an optimal size for the substituent to be introduced at the other o-position. As a result of various investigations, it was found that, of the compounds of this series, Compound VIII absorbs light least in the blue region and shows a highly pure blue color.

Figure 6:
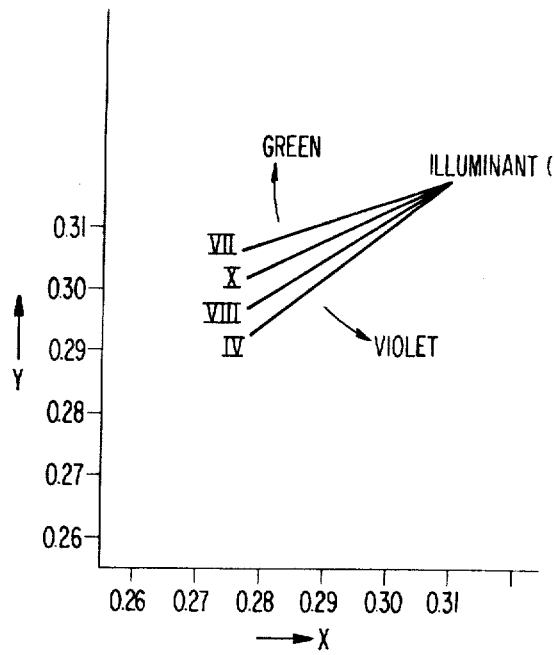
FIG. 6 shows a chromaticity diagram of polyethylene terephthalate films colored with Dyes VII, VIII and X.

FIG. 6 shows the chromaticity of colored polyethylene terephthalate films prepared using representative dyes of this series, Compounds VII, VIII and X. As is clear from FIG. 6, the hues of Compound VII and Compound X were found to deviate toward green from the desirable hue, and only Compound VIII provided the desired excellent hue.

In addition, for a dye to be used as a dope-coloring agent for polyethylene terephthalate film for use as an X-ray photographic film, it is required that the dye possess sufficient heat stability to withstand the molding temperature as high as 270°–300°C and not that the dye decompose or fade. A method of using 1,4-bis(2'-6'-diethylanilino)anthraquinone(Compound XII) as a coloring agent for polyethylene terephthalate film is described in U.S. Pat. No. 3,488,195. Compound XII has a melting point of 207° – 208°C, whereas Compound VIII of the present invention has a melting point of 240°–241°C. As a result of systematic investigations on a series of dye compounds contained in a film formed according to a conventional melt-filming method in which the melt-extrusion temperature and melt residence time were changed, it was found that 1,4-bis(2'-isopropyl-6'-methylanilino)anthraquinone (Compound VIII) is quite suitable as a coloring agent which satisfies the aforesaid various requirements.

Figure 7:
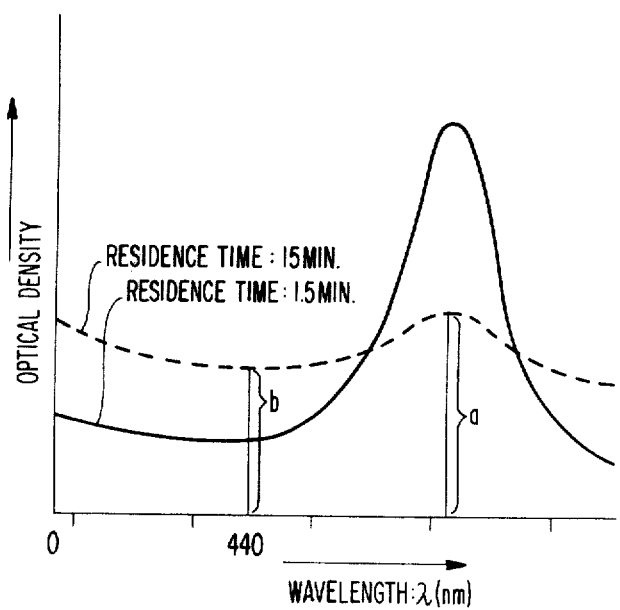
FIG. 7 is a graph explaining the data given in Table 6.

For the purpose of examining the heat stability of dyes, colored plates (1 mm in thickness) were prepared by injection molding at a cylinder temperature of 300°C and at a residence time inside the cylinder of 1.5 minutes or 15 minutes using an injection molding machine (Neomat 150/75, made by Sumitomo Shipbuilding & Machinery Co., Ltd.). The content of the dyes was 0.02 percent by weight based on the polyester. In order to compare the fading of the dyes due to the residence in a cylinder, a spectrophotometer (Molde EPS-3T, made by Hitachi, Ltd.) was used. A dye-free sample prepared under the same conditions was placed in a standard side, and only the change due to the dyes were measured. As is shown in FIG. 7, as the residence time inside the cylinder was increased the dyes were generally heat-decomposed, the absorption peak became small, and the background increased. For the purpose of comparing the dyes with each other, the purity of the color was indicated in terms of b/a, wherein b is the value of the spectral density curve corresponding to yellow or 440 mµ in wave-length and a is the value of a peak appearing at around 600 mµ. Heat resistance was compared in terms of the difference in b/a between a residence time of 1.5 minutes and a residence time of 15 minutes, i.e., Δ (b/a). The results thus obtained are shown in Table 6.

Table 6

| Residence Time at a Cylinder Temp. of 300°C (min.) Compound No. | b Value at 440 mµ | | a Peak Value | | b/a Purity of Color | | Δ(b/a) b/a(15 min.)-b/a(15 min.) 15 |
|---|---|---|---|---|---|---|---|
| | 1.5 | 15 | 1.5 | 15 | 1.5 | 15 | |
| VII | 19 | 22 | 77 | 71 | 0.247 | 0.310 | 0.063 |
| VIII | 3.5 | 5 | 83 | 81.5 | 0.042 | 0.061 | 0.019 |
| IX | 3.5 | 10.5 | 85 | 83.5 | 0.041 | 0.126 | 0.085 |
| X | 7 | 14 | 70.5 | 70.5 | 0.099 | 0.199 | 0.100 |
| XII | 3.5 | 10.5 | 86.5 | 86.5 | 0.042 | 0.121 | 0.086 |

As is clear from Table 6, it was confirmed that the heat stability of the dye compound VIII of the present invention was extremely excellent.

The sublimation resistance of the dyes was measured by the following method. That is, 2 mg of a dye was placed at the bottom of a hard glass test tube of an inside diameter of 18 mm and a length of, 200 mm and 20 g of polyethylene terephthalate chips of 4 mm × 4 mm × 2.5 mm were intimately added thereto. Such test tubes containing different dyes (VII, VIII, IX, X or XII) were connected to a vacuum line and slowly evacuated to 0.1 mmHg for 5 minutes. Thereafter, while connecting to the vacuum line, the test tubes were dipped in an oil bath thermostaticly heated to 180°C ± 2°C up to about ⅔ of the length of the test tube from the bottom thereof and evacuated for 4 hours. Then, the test tubes were withdrawn. The surface of the polyethylene terephthalate chips was colored, with a definite density gradient upward from the bottom, due to the sublimation and adsorption of the dyes. The shift distance of the dyes up toward the top of the colored chips was measured in mm for comparison. The results given in Table 7 shows that Dye VIII of the present invention was particularly excellent in sublimation resistance.

Table 7

| Compound No. | Sublimation Resistance (shift distance of the sublimed dye, mm) |
|---|---|
| VII | 70 |
| VIII | 60 |
| IX | 65 |
| X | 80 |
| XII | |
| XIV | 90 |

The experimental data are tabulated in Table 8 together with, for further understanding, the results obtained with 1,4-bis(2'-tert-butylanilino)anthraquinone (Compound XIII) and 1,4-bis(2'-ethyl-6'-methylanilino)anthraquinone (Compound XIV).

films which satisfies extremely severe requirements with respect to the photographic properties, heat resistance, sublimation resistance, compatibility and hue at the same time.

As is stated above in detail, as a result of systematic analysis of structures, physical properties and data of experiments, 1,4-bis(2'-isopropyl-6'-methylanilino)anthraquinone has been found which satisfies the aforesaid requirements at the same time. The compound of the invention is a novel compound not described in the literature, and may be synthesized easily by heating 1,4,9,10-tetrahydroxyanthracene together with 2-isopropyl-6-methylaniline in the presence of a dehydrating agent to react. The crude product may be purified using simple procedures to obtain the purified product.

As a result of various investigations, boric acid as described in Japanese Pat. Publication No. 29187/69 or boric acid alcohol esters as described in British Pat. No. 969,059, such as the boric acid ester of 2-methylpentane-2,4-diol are found to be effective as the dehydrating agent. The reaction may be completed smoothly in a short time by using such dehydrating agents.

The reaction may be conducted usually by heating a mixture of 1,4,9,10-tetrahydroxyanthracene, 2 to 6 equivalent amounts, preferably 2.5 to 4.0 equivalent amounts, of the amine component, and 0.5 to 5 equivalent amounts, preferably 2 to 4 equivalent amounts, of a dehydrating agent at 130° to 180°C while removing, if necessary, the water produced under reduced pressure. Or, the reaction may also be conducted uniformly and smoothly by reacting at the boiling point of a high-boiling solvent such as alcoholic solvents (e.g., n-butanol, Table 8

| Carbon Number of Alkyl Substituent | Aryl Group (d = sublimation shift distance; mm) | | |
|---|---|---|---|
| c = 6 | — | — | (2,6-di-isopropylphenyl) Compound X (d = 80) |
| c = 4 | C(CH$_3$)$_3$ Compound XIII (d = 50) | CH(CH$_3$)$_2$, CH$_3$ Compound VIII (d = 60) | C$_2$H$_5$, C$_2$H$_5$ Compound XII (d = 100) |
| c = 3 | CH(CH$_3$)$_2$ Compound VII (d = 70) | C$_2$H$_5$, CH$_3$ Compound XIV (d = 90) | — |

From the above Table 8, it can be seen that the sublimation resistance becomes large as the substituents at the 2'- and 6'-positions become more non-symmetric and as the carbon number of the substituent alkyl group increases.

It is also clear from the Example given hereinafter that the dye of the present invention is excellent in compatibility and does not affect the photographic properties of silver halide emulsions.

As was described above, an object of the present invention is to provide a coloring agent for polyethylene terephthalate film for use as X-ray photographic n-amyl alcohol, n-hexyl alcohol, 2-ethyl-hexanol, etc.). The reaction is, in general, completed in about 5 to 20 hours. The reaction product is dissolved in chloroform and, after removing the insolubles, washed with dilute hydrochloric acid to remove the non-reacted amine component, and then recrystallized using a suitable solvent or, if necessary, purified by chromatography. Thus, there can be obtained a highly pure end product.

The process for synthesizing 1,4-bis(2'-isopropyl-6'-methylanilino)anthraquinone to be used in the invention will now be described more specifically by reference to the following synthesis example.

Unless otherwise indicated all parts and percents are by weight.

SYNTHESIS EXAMPLE

1,4-bis(2'-Isopropyl-6'-methylanilino) anthraquinone (Compound VIII)

A mixture of 48 g of 1,4,9,10-tetrahydroxyanthracene, 100 ml of 2-methyl-6-isopropylaniline and 40 g of boric acid was heated to 150°–160°C for 3 hours under stirring to react. After cooling, 20 percent hydrochloric acid was added thereto to make the reaction system acidic. Thereafter, the precipitate formed was fittered out, washed well with water, then dried. Subsequently, the resulting crude product was mixed with a mixture of 60 ml of nitrobenzene and 5 ml of piperidine and, after heating at 130°–140°C for 3 hours, nitrobenzene was distilled off to obtain a blackish blue residue. This was then dissolved in ethanol and, after treating with active carbon, recrystallized two times from benzene to obtain 52 g of bluish violet crystal having a melting point of 240°–241°C. Elemental Analysis:

Calcd. for $C_{34}H_{34}O_2N_2$: C 81.27; H 6.77; N 5.58 %
Found: C 81.80; H 6.83; N 5.58

The resulting dye shows the spectral absorption spectrum as described in Table 5, and was confirmed to be 1,4-bis(2'-isopropyl-6'-methylanilino)anthraquinone from the analysis of infrared absorption spectrum, NMR absorption spectrum [1.05, 1.12, 1.124, 3.13 ppm (isopropyl); 2.14 ppm (methyl); 8.41, 7.71, 6.51 ppm (anthraquinone nucleus); 7.15 ppm (phenyl); 11.83 ppm (NH); in a heavy chloroform solution].

In this synthesis example, when the reaction between 1,4,9,10-tetrahydroxyanthracene and 2-methyl-6'-isopropylaniline was conducted at a similar temperature for 5 hours using as a dehydrating agent 45 g of boric ester, prepared by heating 2-methyl-2,4-pentanediol together with boric acid, in place of the boric acid, followed by quite the same after-treatment as set forth above, 58 g of dye Compound (VIII) having a melting point of 240° to 242°C was obtained.

Also, when the crude product obtained in the first step dehydration reaction was oxidized by heating for 6 hours in a system of 350 ml of ethanol and 10 ml of piperidine while bubbling air thereinto instead of oxidizing in the presence of nitrobenzene and the reaction product was after-treated in a conventional manner, 59 g of the dye Compound (VIII) having a melting point of 239°–241°C was obtained.

Furthermore, highly pure dye Compound (VIII) was effectively obtained by purifying the crude product obtained in the second step oxidation reaction by column chromatography using alumina as a column packing and using n-hexane, benzene or the mixture there as the developing solvent. On this occasion, the black reaction by-product contained in the crude product was removed with ease since it was adsorbed onto the upper portion of the packed alumina layer. Thus, column chromatography served to simplify the subsequent recrystallization procedures and was therefore extremely effective.

Various 1,4-bis(dialkyl-substituted amino)antraquinones described in Tables 2 and 4 were obtained with corast from 1,4,9,10-tetrahydroxyanthracene and a corresponding dialkyl-substituted aniline in quite the same manner as in the above-described synthesis example.

The thus obtained Dye (VIII) is an absolutely novel compound which colors hydrophobic polymer materials, particularly polyester and polyamide products a distinct, highly pure blue tone. In addition, the dye possesses high compatibility, excellent heat fastness and sublimation fastness. The polyester and polyamide products include various moldings in addition to fibers and film materials such as photographic film products and packing film products, which can be dyed using conventional dyeing methods or melt-dyeing methods. The Dye (VIII) of the invention is particularly effective for polyethylene terephthalate film for a photographic film support. Generally, for a X-ray film support from about 0.005 to 0.04 percent preferably from about 0.015 to 0.025 percent, by weight of the dye is used but this can be varied freely depending on the ultimate end use.

In the case of using as an X-ray photographic film support, a polyethylene terephthalate film colored with the Dye (VIII) of the invention according to a melt-dyeing method, the surface of the film was activated by subjecting it to activating processing such as irradiation with ultraviolet rays a corona discharge treatment, a treatment with chromic acid or with airpropane flame, etc., a known subbing layer as described in Japanese Pat. Publication Nos. 25835/68, 2529/69, 29995/69, and the like was provided thereon, and a known emulsion for use in X-ray photography as described in Japanese Patent Publication No. 7845/72, etc. was applied thereto to prepare a photographic film. The resulting photographic film can be processed in various known manners.

The present invention will now be illustrated in more detail by reference to several non-limiting examples of preferred embodiments of the invention.

EXAMPLE 1

A 0.180 mm-thick film was prepared according to a melt-filming method by adding 0.02 percent by weight of Dye Compound (VIII) to polyethylene terephthalate chips, dry-blending to dry, and conducting melt-extrusion. The resulting film was blue and a reduction in transparency, clouding and defects due to nondispersed particles were not observed. Both surfaces of this film were irradiated with ultraviolet rays at 80°C for 1 minute in air using a 1 KW quartz-made mercury lamp as described in Japanese Patent Publication No. 2603/68. Thereafter, a gelatin-organic solvent dispersion having the following composition was immediately applied thereto followed by drying at 120°C for 2 minutes.

| Gelatin | 1 | part by weight |
|---|---|---|
| Acetic Acid | 1 | " |
| Methanol | 20 | " |
| Acetone | 60 | " |
| Methylene Chloride | 10 | " |
| Tetrachloroethane | 5 | " |
| Phenol | 5 | " |

To a high speed silver bromide emulsion for use in X-ray photography (AgI: 1.5 mol percent, gelatin content: 150 g/mol AgX) having been sulfursensitized and gold-sensitized were added chromium alum and saponin in suitable amounts. This emulsion was then applied to both surfaces of the above-described subbed film base in an amount of 55 mg/100 cm$^2$ on a silver basis for each surface, then dried to prepare medical X-ray films.

The resulting medical X-ray films were exposed for 0.5 second to conduct X-ray photographing under the conditions given in the following Table 9 with the distance between an X-ray source and the object to be X-rayed being 80 cm using as a test object a phantom (made by Anderson Research Laboratories, Inc.) and using as an X-ray intensifying screen KYOKKO-FS containing $CaWO_4$ (made by Dainippon Paint Manufacturing Co., Ltd.).

Table 9

| Sample No. | Phantom | Electric Current (mA) | Voltage (V) |
| --- | --- | --- | --- |
| I | Head | 100 | 80 |
| II | Breast | 100 | 60 |
| III | Lumbar | 100 | 80 |
| IV | Leg | 100 | 40 – 50 |

Then, the thus photographed medical X-ray films I, II, III and IV were processed at 20°C for 4 minutes using a developer having the following composition.

| Composition of Developer: | |
| --- | --- |
| Metol | 4.0 g |
| Anhydrous Sodium Sulfite | 60.0 g |
| Hydroquinone | 10.0 g |
| Anhydrous Sodium Carbonate | 53.0 g |
| Potassium Bromide | 2.5 g |
| Water to make | 1 liter |

As compared with the images formed in the same manner as above on X-ray films prepared by sing Dyes VII, IX, X, XII etc., the image on X-ray films prepared by sing Dyes VII, IX, X, XII etc., the image developed on these medical X-ray films in accordance with the invention facilitated the discrimination of the images and, in addition, photographic properties such as sensitivity, gamma, fog, etc. suffered no change. Furthermore, no changes were observed even when the films were stored under severe conditions of temperature and humidity.

While the invention has been described in detail and with reference to specific embodiments thereof, it will be apparent to one skilled in the art that various changes and modifications can be made therein without departing from the spirit and scope thereof.

What is claimed is:

1. An X-ray photographic material comprising a support having thereon an X-ray sensitive silver halide photographic emulsion, said support comprising a polyethylene terephthalate film containing the compound 1,4-bis(2'-isopropyl-6'-methylanilino) anthraquinone.

2. The photographic material of claim 1, wherein said compound is present in an amount sufficient to impart a blue color to said film.

3. A photographic silver halide light-sensitive material comprising as a support a polyethylene terephthalate film containing 1,4-bis(2'-isopropyl-6'-methylanilino) anthraquinone.

4. The photographic material of claim 3, wherein said compound is present in an amount sufficient to impart a blue color to said film.

* * * * *